United States Patent
Herrling et al.

(10) Patent No.: US 12,240,313 B2
(45) Date of Patent: Mar. 4, 2025

(54) MOTOR VEHICLE COOLING SYSTEM WITH AN ELECTRIC COOLANT PUMP

(71) Applicant: NIDEC GPM GmbH, Auengrund OT Merbelsrod (DE)

(72) Inventors: Luis Herrling, Föritztal (DE); Heidemarie Weinert, Reurieth OT Siegritz (DE); Conrad Nickel, Troistedt (DE); Jakob Schnitzer, Hilburghausen (DE)

(73) Assignee: NIDEC GPM GMBH, Auengrund OT Merbelsrod (DE)

( * ) Notice: Subject to any disclaimer, the term of this patent is extended or adjusted under 35 U.S.C. 154(b) by 106 days.

(21) Appl. No.: 17/891,201

(22) Filed: Aug. 19, 2022

(65) Prior Publication Data

US 2023/0060455 A1 Mar. 2, 2023

(30) Foreign Application Priority Data

Aug. 31, 2021 (DE) ..................... 10 2021 122 505.1

(51) Int. Cl.
| | |
|---|---|
| *B60K 11/02* | (2006.01) |
| *F04B 39/12* | (2006.01) |
| *F04B 39/14* | (2006.01) |
| *F04B 53/16* | (2006.01) |
| *F04B 53/22* | (2006.01) |
| *F16B 2/14* | (2006.01) |

(52) U.S. Cl.
CPC ............ *B60K 11/02* (2013.01); *F04B 39/121* (2013.01); *F04B 39/14* (2013.01); *F04B 53/16* (2013.01); *F04B 53/22* (2013.01); *F16B 2/14* (2013.01)

(58) Field of Classification Search
CPC ........ F04B 39/121; F04B 39/14; F04B 53/16; F04B 53/22; F16B 2/14
See application file for complete search history.

(56) References Cited

U.S. PATENT DOCUMENTS

| | | | | |
|---|---|---|---|---|
| 2,936,947 A | * | 5/1960 | Staak ..................... | F04D 29/424 417/353 |
| 3,401,870 A | * | 9/1968 | Crowe ................... | F04D 29/626 417/353 |
| 4,155,529 A | * | 5/1979 | Maudlin .................. | F16M 5/00 416/500 |
| 4,200,257 A | * | 4/1980 | Litch, III ................. | H02K 5/24 417/423.15 |
| 4,452,417 A | * | 6/1984 | Krafthefer ............ | F16F 1/3732 248/635 |

(Continued)

FOREIGN PATENT DOCUMENTS

| | | |
|---|---|---|
| DE | 197 30 810 A1 | 2/1998 |
| DE | 196 52 328 A1 | 6/1998 |
| DE | 10 2007 038 522 A1 | 2/2009 |

*Primary Examiner* — Christopher S Bobish
(74) *Attorney, Agent, or Firm* — Keating & Bennett, LLP (57) ABSTRACT

A motor vehicle cooling system with an electric coolant pump includes a housing with a pump shaft. The electric coolant pump includes an electric motor in a motor housing. The electric coolant pump is at least partially accommodated in the pump shaft. A clamping device including at least two clamping arms is attached to an upper side of the motor housing. The clamping arms are supported with free ends thereof on an inner side of the pump shaft to clamp the electric coolant pump to the housing.

9 Claims, 6 Drawing Sheets

(56) References Cited

U.S. PATENT DOCUMENTS

| | | | | |
|---|---|---|---|---|
| 4,636,673 | A * | 1/1987 | McDonald | F04D 29/626 310/91 |
| 4,643,386 | A * | 2/1987 | Chastine | F16F 1/373 310/91 |
| 4,768,925 | A * | 9/1988 | Geupel | F04D 29/606 415/213.1 |
| 5,044,883 | A | 9/1991 | Neueder | |
| 5,492,456 | A * | 2/1996 | Knight | F04D 29/626 417/423.15 |
| 6,854,451 | B2 * | 2/2005 | Ebihara | F02M 37/106 123/509 |
| 7,318,422 | B2 * | 1/2008 | Douyama | F04B 17/03 123/495 |
| 7,909,587 | B2 * | 3/2011 | Hagist | B60K 15/077 417/360 |
| 8,800,598 | B2 * | 8/2014 | Beyer | F02M 37/106 417/363 |
| 8,876,092 | B2 * | 11/2014 | Wojcieson | F16F 15/08 267/141 |
| 8,939,736 | B2 * | 1/2015 | Israelson | F01C 19/005 417/310 |
| 9,945,390 | B2 * | 4/2018 | Cocks | F04D 29/667 |
| 10,221,855 | B2 * | 3/2019 | Post | F04D 25/068 |
| 11,098,684 | B2 * | 8/2021 | Takemura | F02M 37/106 |
| 2003/0107284 | A1 * | 6/2003 | Wickham | H02K 5/00 310/90 |
| 2017/0343125 | A1 * | 11/2017 | Takahashi | F16K 21/04 |
| 2021/0381520 | A1 | 12/2021 | Pawellek | |

* cited by examiner

MOTOR VEHICLE COOLING SYSTEM WITH AN ELECTRIC COOLANT PUMP

CROSS REFERENCE TO RELATED APPLICATION

The present application claims priority under 35 U.S.C. § 119 to German Application No. 10 2021 122 505.1, filed on Aug. 31, 2021, the entire contents of which are hereby incorporated herein by reference.

1. Field of the Invention

The present disclosure relates to a motor vehicle cooling system with an electric coolant pump, and to a method for inserting an electric coolant pump into a motor vehicle cooling system.

2. Background

In motor vehicles, motor vehicle cooling systems are used for a temperature-increasing device, in particular a traction battery, preferably for an electric or hybrid vehicle.

These coolant pumps are usually radial centrifugal pumps. In terms of mounting, a distinction is made between plug-in pumps and add-on pumps. In the case of plug-in pumps, parts of the design, such as the spiral channel and the inlet, are located in a housing of the cooling system.

The plug-in pumps are inserted in a pump shaft or pump well formed in the housing. Until now, the pumps have been mounted in the pump shaft by clamps in conjunction with an elastomer ring. However, this only serves to fix the pump in the housing to a limited extent and such a fastening has a large radial space requirement. In addition, no defined position can be set with such a fastening and the function is only guaranteed in conjunction with soft tubing, as otherwise part of the pump load must be borne by pipes adjoining the pump.

SUMMARY

Example embodiments of the present disclosure provide an improved structure to connect a plug-in pump to a housing, which has a simple assembly with a defined installation position and reduced radial space requirement.

Accordingly, a motor vehicle cooling system with an electric coolant pump according to an example embodiment of the present disclosure is provided. The motor vehicle cooling system includes a housing with a pump shaft and the electric coolant pump includes an electric motor in a motor housing. The electric coolant pump is at least partially plugged into the pump shaft, i.e., the coolant pump is a plug-in pump. Preferably, the inlet and outlet as well as the pump chamber in which the impeller is provided are defined in the housing. A clamping device including at least two clamping arms is fastened to an upper side of the motor housing, the clamping arms being positioned with their free ends against an inner side of the pump shaft (preferably digging in to form a frictional connection) and clamping the electric coolant pump to the housing, which in the case of an electric vehicle is made, for example, of plastic.

The clamping device allows easy assembly. In addition, a defined position of the coolant pump in the axial direction in the pump shaft can be achieved. In addition, the clamping device includes a small radial installation space. Preferably, the upper side of the motor housing is a housing cover that covers a mounting opening.

Preferably, wedge-shaped projections are provided on a peripheral surface of the motor housing. Each of the at least two clamping arms is supported on one of the projections, and the height of the projections increases longitudinally downwardly from the peripheral surface such that when the clamping device is mounted on the top of the motor housing, the clamping arms slide on the wedge-shaped projections and spread outwardly away from the longitudinal axis of the electric coolant pump.

In addition to the force fit, a form fit can be provided in which the free ends of the clamping arms engage in corresponding recesses on the inside of the pump shaft. The recesses can be window-shaped. It is advantageous if the clamping arms are wedge-shaped in the end region, with the height of the end region decreasing outwards in the radial direction, so that the clamping arms can slide into the window-shaped recesses over the wedge and engage there.

Preferably, the clamping device includes a central mounting area from which the clamping arms extend radially outward approximately parallel to the top of the engine housing, the clamping arms being evenly spaced in the circumferential direction relative to the longitudinal axis of the electric coolant pump.

The motor vehicle cooling system preferably includes a circumferential gap between the electric coolant pump and the pump shaft, the clamping arms including a first bend such that they extend approximately parallel to the jacket surface of the engine housing in a first region adjacent the region where the clamping arms extend parallel to the top surface of the engine housing and a second bend defining a second region between the second bend and the free end, the second region of the clamping arms spanning the gap. Preferably, the second region is the wedge-shaped end region. Preferably, the clamping arms bear against the wedge-shaped projections of the motor housing with the underside or inner side of the second bend.

Clamping is particularly easy if the wedge-shaped projections of the motor housing define a slip angle with the normal to the outer surface of the motor housing that is significantly smaller than the angle of the wedge-shaped end section of the clamping arms.

For fastening the clamping device on the upper side of the motor housing, the motor housing can include a threaded dome with an external thread on the upper side, on which the central fastening area of the clamping device is placed and fastened by a nut. However, it is also conceivable that the motor housing has an opening with an undercut on the upper side into which the clamping device engages by being pressed in in the axial direction.

An example embodiment of the present disclosure also provides a method of inserting an electric coolant pump into an automotive cooling system, the automotive cooling system including a housing with a pump shaft, and the electric coolant pump including an electric motor in a motor housing. The method includes the steps of inserting the electric coolant pump into the pump shaft, advancing a clamping device towards the upper side of the engine housing, the clamping device including at least two clamping arms which are supported on a jacket surface of the engine housing, and fixing the clamping device on the upper side of the motor housing and moving the clamping device in axial direction towards the upper side of the motor housing. The clamping arms are spread away from each other by sliding against the jacket surface of the motor housing relative to the longitudinal axis and are pressed with their free ends against the inner side of the pump shaft in such a way that a frictional connection is created between the clamping device and the housing with axial holding force.

This process is particularly simple, since in fixing the clamping device on the upper side of the motor housing it is only necessary to act on the motor housing in the axial direction.

Preferably, in fixing the clamping device on the upper side of the motor housing, the clamping device is fastened to the top of the motor housing by a screw connection, or the top of the motor housing includes an opening into which the clamping device engages.

It is advantageous if, in fixing the clamping device on the upper side of the motor housing, the free end of the clamping arms engages in corresponding recesses on the inside of the pump shaft to produce a positive fit.

It may also be provided that the clamping arms include a wedge-shaped end portion which slides along an upper edge of the recess in fixing the clamping device on the upper side of the motor housing in order to achieve a specific form and force fit.

It is also conceivable that during assembly the clamping device is first placed on the motor housing when fixing the clamping device on the upper side of the motor housing and then inserted into the pump shaft and finally fastened.

The clamping device and/or the housing are preferably structured as described above.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are described in more detail below with reference to the drawings. Identical components or components with identical functions bear identical reference signs. They show.

DETAILED DESCRIPTION

FIGS. 1 to 5 show a section of a housing 1 of a motor vehicle cooling system. The housing 1 has a pump shaft 2 which comprises an opening 3 and an elongated, tubular region 4 adjoining it. An electric coolant pump 5 in the form of a plug-in pump is inserted in this region 4. The plug-in pump is a radial-flow centrifugal pump, which preferably has a closed impeller wheel as an impeller. An inlet, a pump working chamber, and an outlet, for example in the form of a spiral channel, of the electric coolant pump 5 are formed in the housing 1 (not shown). The electric coolant pump 5 has an electric motor which is seated in a motor housing 6 and drives an impeller which is not shown. The motor housing 6 has a mounting opening on the side opposite the impeller, which is closed by a housing cover 7. An electrical connection 8 is formed in the housing cover 7, into which a plug connector for controlling the electric motor can be plugged.

The electric coolant pump 5 is held centered in the pump shaft 2 by a clamping device 9. A circumferential, annular gap 11 is provided between the coolant pump 5 and an inner side 10 of the pump shaft 2. The clamping device 9 is held stationary centrally on the upper side of the housing cover 7 and, starting therefrom, has three clamping arms 12 which extend in the radial direction and are evenly spaced in the circumferential direction. The clamping arms 12 project outwardly beyond the housing cover 7 and the gap 11. The clamping arms 12 have an approximately right-angled bend 13 which has an inside diameter corresponding, with some play, to the outside diameter of the housing cover 7 or the outer surface of the engine housing 6. The clamping arms 12 thus run parallel to the outer surface of the motor housing 6 in a first region 14. This first region 14 is adjoined by a second approximately right-angled bend 15, which forms a bearing surface 16 on the inside or underside. The adjoining second region 17 extends in the radial direction over the gap 11 and has a free end 18. The second region 17 of the clamping arm 12 is wedge-shaped in longitudinal section, with the height decreasing outwardly in the radial direction and the underside lying approximately perpendicular to the longitudinal axis of the pump. The s-shaped course of the clamping arms 12 in the side view enables targeted bracing of the coolant pump 5 in the pump shaft 2.

For this purpose, the clamping arms 12 are supported at their free, outer ends 18 on the inside 10 of the pump shaft 2. In the pump shaft 2, recesses 19 extending in the longitudinal direction are provided in the contact area with the clamping arms 12, which form a guide for the ends of the clamping arms 18 in the longitudinal direction during assembly. The recesses 19 define the position of the clamping arms 12 in the pump shaft 2 and form a positive fit with them.

Figure 6:
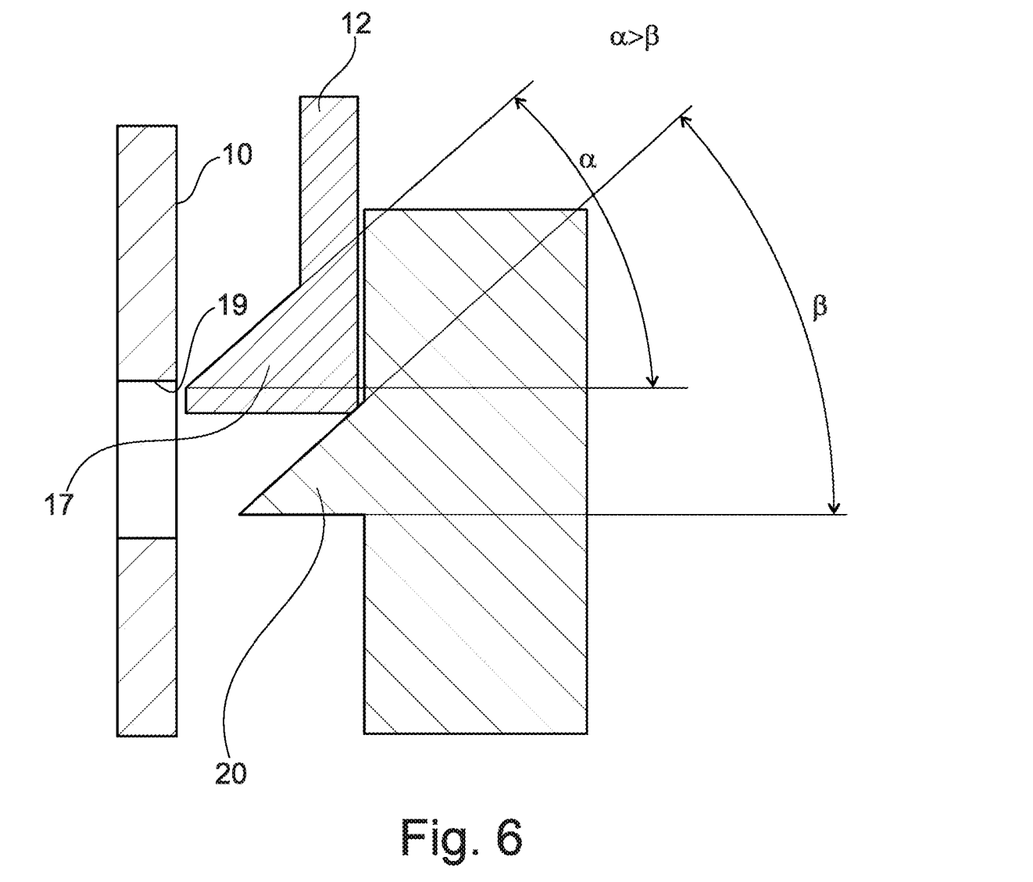
FIG. 6 shows a schematic representation of a section of a coolant pump inserted into the pump shaft according to an example embodiment of the present disclosure.

Wedge-shaped projections 20 are provided on the outer jacket surface of the motor housing 6 to support the clamping arms, the height from the outer surface of which increases longitudinally downwards (from the housing cover side). The wedge-shaped projections 20 form a slip angle with the normal to the lateral surface of the motor housing 6 (see FIG. 6). During assembly, the lower or inner side of the second bend 15 of the clamping arm 12 rests on the upper side of the wedge-shaped projections 20 of the motor housing 6 when the clamping arms 12 are expanded, and slides off by the slip angle. The upper side of the second wedge-shaped portion 17 or the free end 18 of the clamping arm 12 slides along the inner side 10 of the pump shaft 2. It can be provided that the recess 19 in the area of the inner side 10 of the pump shaft 2 is only window-shaped and the upper side of the second, wedge-shaped region 17 is guided along the upper edge of the window-shaped recess 19 when the clamping arms 12 are expanded. In this case, the slip angle $\beta$ of the projections 20 of the motor housing 6 is significantly smaller than the angle of the wedge-shaped upper side of the clamping arm, so that the components are braced against each other, as shown in FIG. 6. However, the slip angle $\beta$ of the wedge-shaped projection must not be too small so that self-locking does not occur.

When mounting the clamping device, it is fed in longitudinal direction to the upper side of the housing cover. This causes the clamping arms to deform elastically. The clamping arms slide on the wedge-shaped projections of the motor housing and are spread in the radial direction. The clamping arms thus exert an axial force against the element to be clamped and the components are clamped together with a frictional connection. Forces acting on the coolant pump can be absorbed by the clamping device so that tilting of the coolant pump in the pump shaft can be prevented.

It may also be provided that the wedge-shaped protrusions are one circumferential protrusion so that the electric coolant pump can be mounted independent of angle.

The clamping device has a low radial space requirement in contrast to the conventionally used clamps. Installation in the final system is also particularly simple, as the clamping device only needs to be acted on in the axial direction. Due to the defined position of the coolant pump in the pump shaft, a connection with piping is possible.

FIGS. 2 to 5 show two different ways of attaching the clamping device 9 to the housing cover 7.

Figure 1:
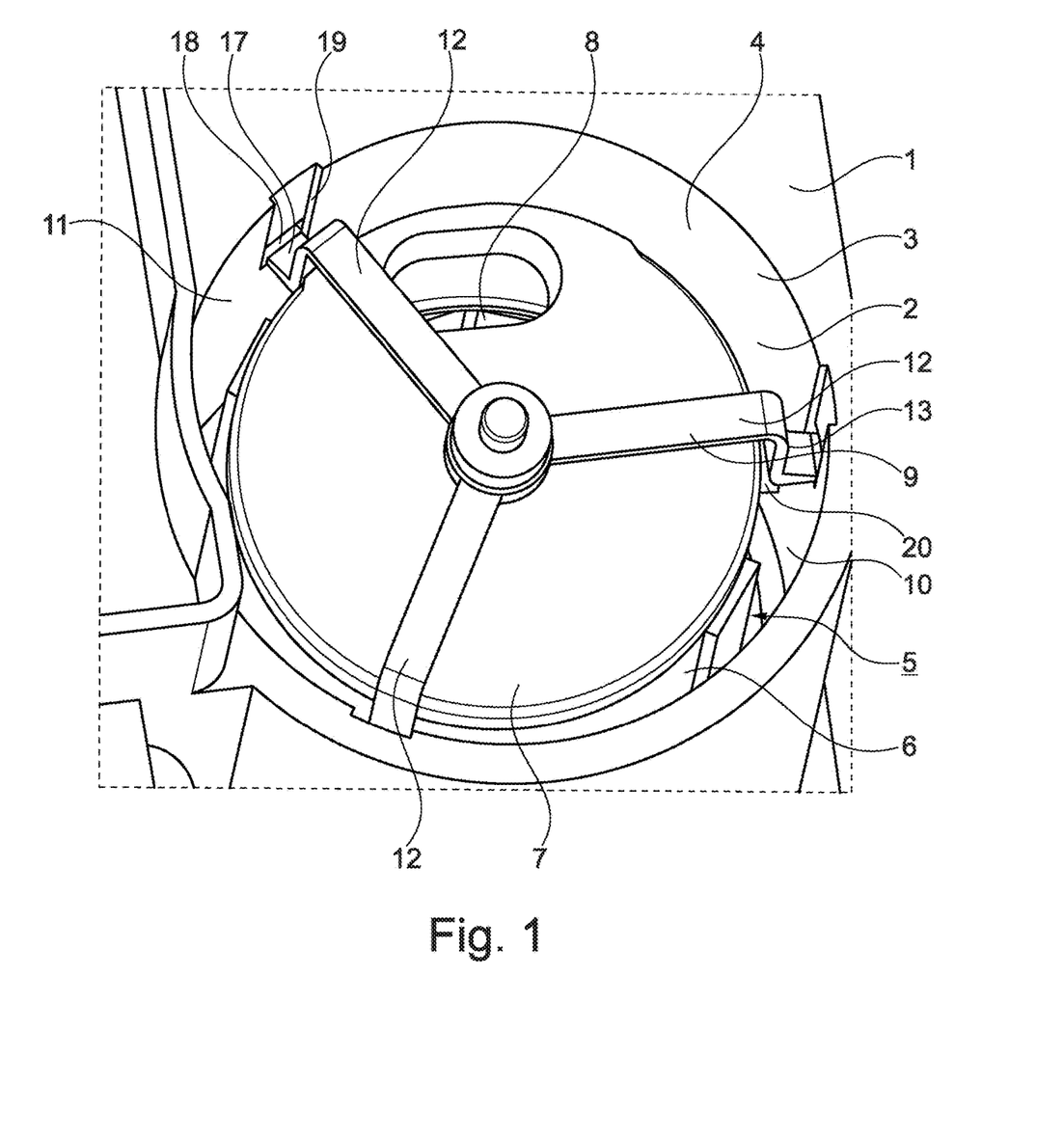
FIG. 1 shows a top view of a pump shaft of a motor vehicle cooling system with coolant pump inserted according to an example embodiment of the present disclosure.
Figure 2:
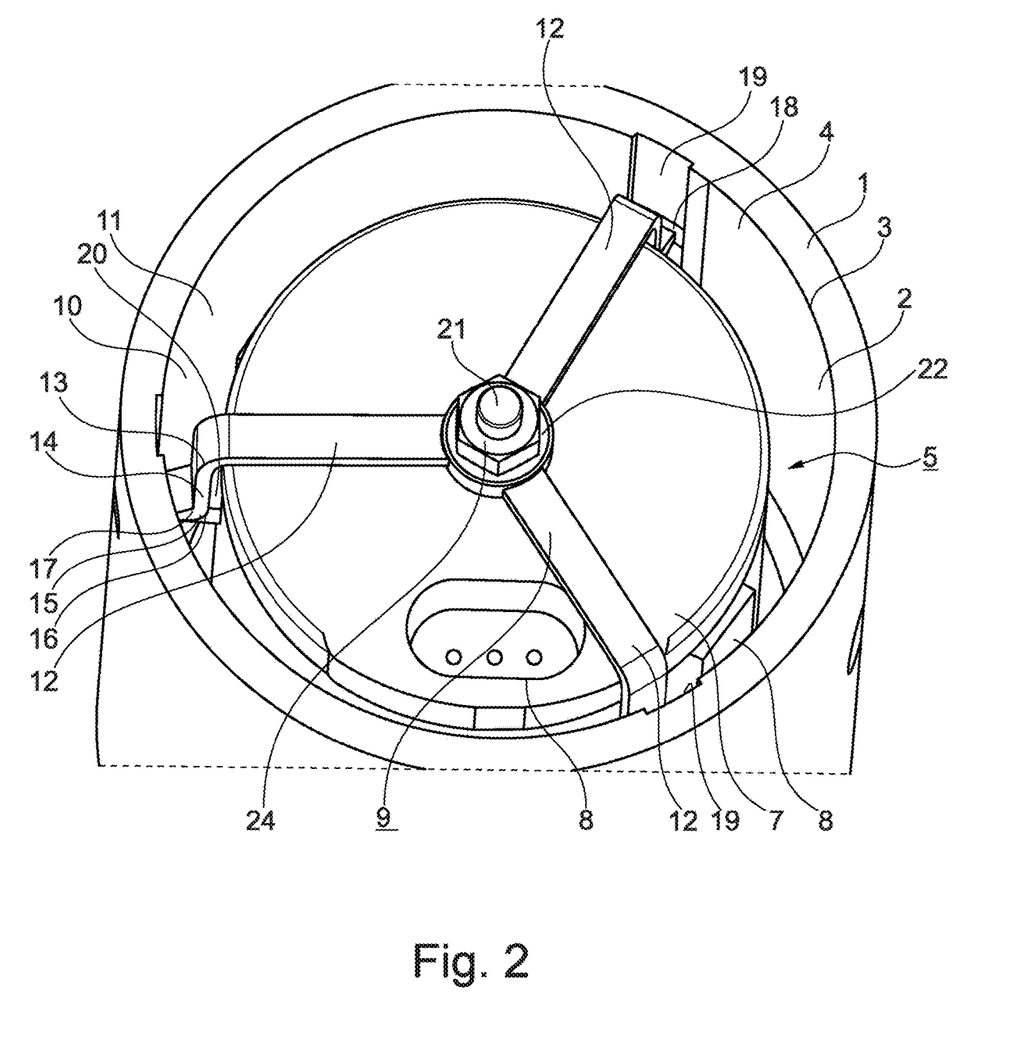
FIG. 2 shows a top view of a pump shaft of a motor vehicle cooling system with coolant pump inserted according to an example embodiment of the present disclosure.
Figure 3:
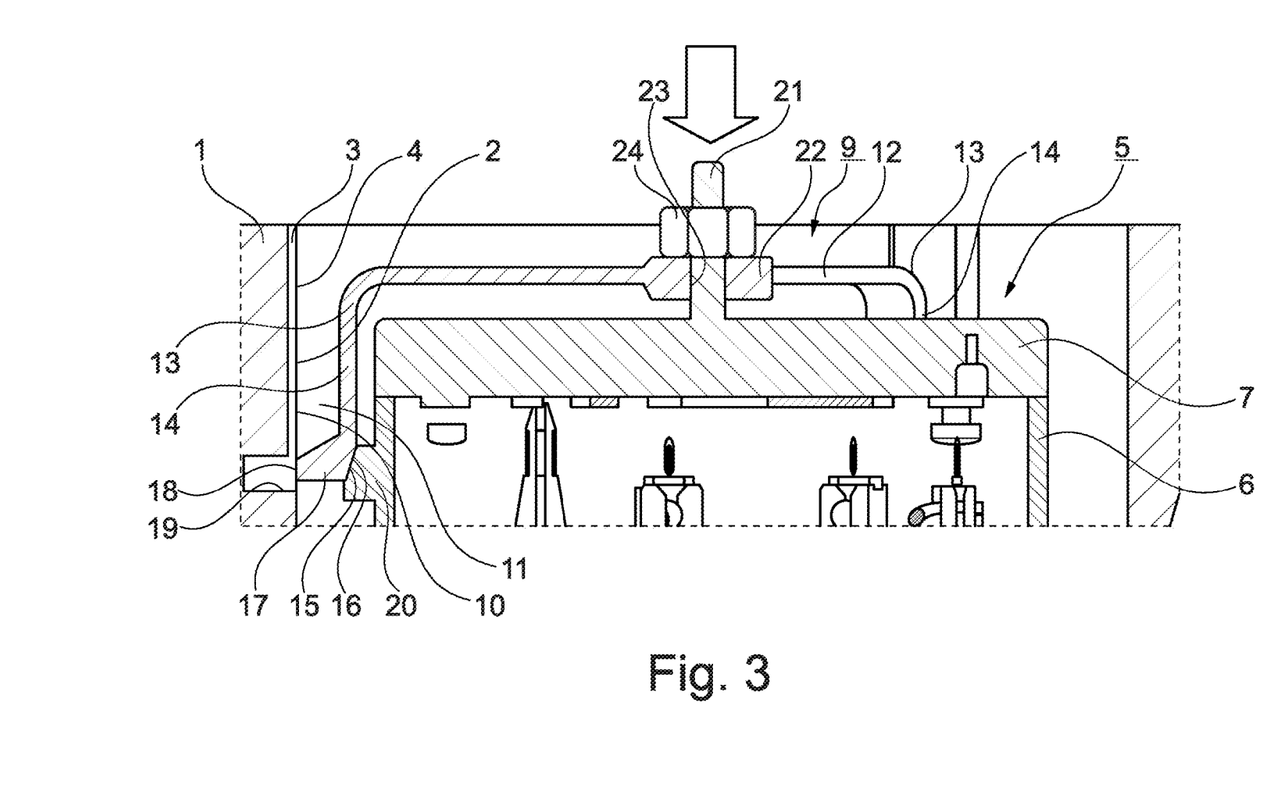
FIG. 3 shows a longitudinal section through the arrangement of FIG. 2.

FIGS. 2 and 3 show a centered threaded dome 21 with an external thread projecting longitudinally upward from the top of the housing cover 7. The clamping device 9 is mounted on the threaded dome 21. For this purpose, the clamping device 9 has in its center an annular area 22 with a centrally arranged penetrating bore 23. The clamping arms 12 extend from the annular area 22. The clamping device 9 is placed on the threaded dome 21 so that the latter passes through the bore 23. A nut 24 is again placed on the threaded dome 21, and screwing the nut 24 onto the threaded dome 21 pushes the clamping device 9 down toward the top of the housing cover so that the clamping arms 12 slide on the wedge-shaped projections of the engine housing 20 and clamp the coolant pump in the pump shaft. The bolting also provides a safeguard against loosening of the clamping device due to vibrations.

Figure 4:
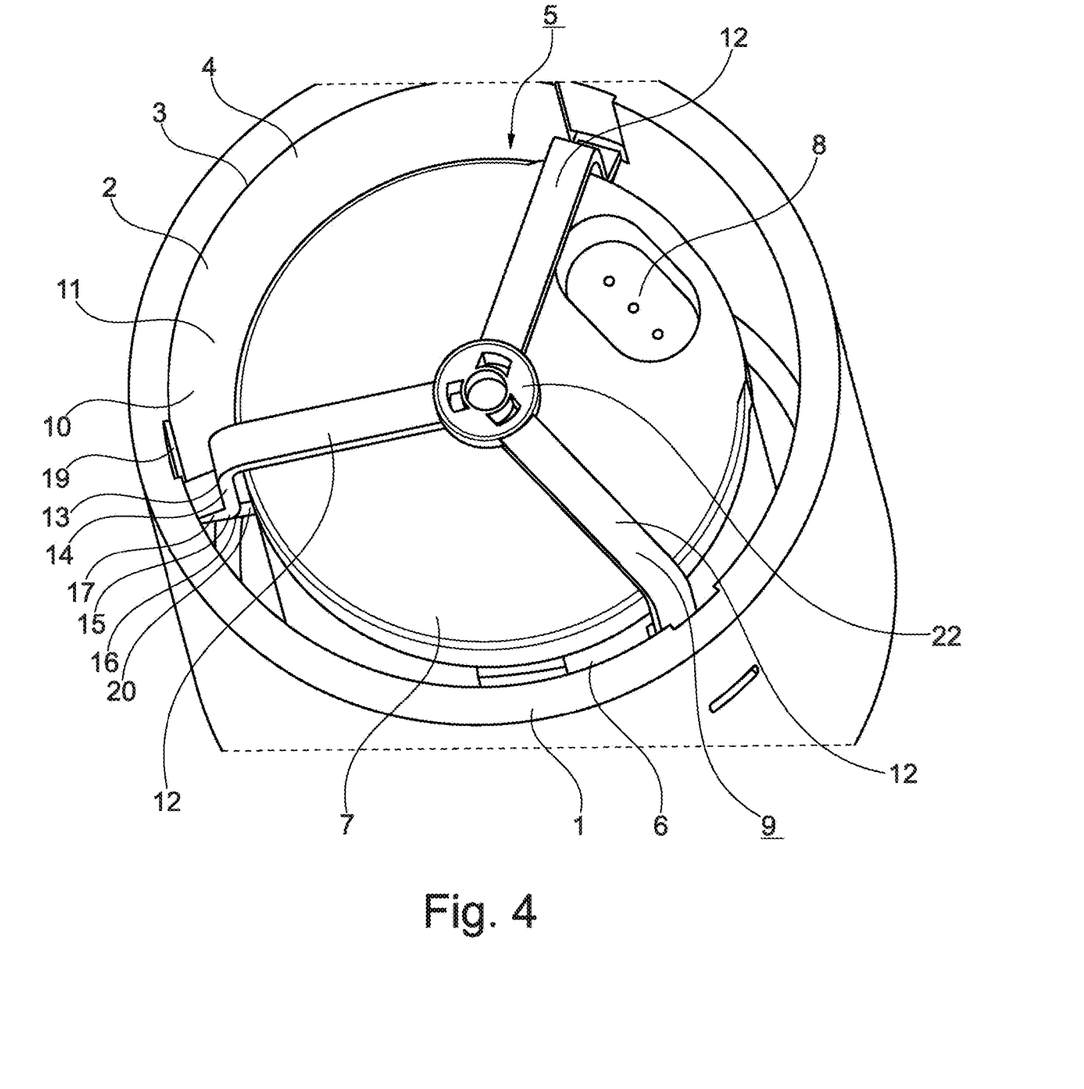
FIG. 4 shows a top view of a pump shaft of a motor vehicle cooling system with a coolant pump in place according to an example embodiment of the present disclosure.
Figure 5:
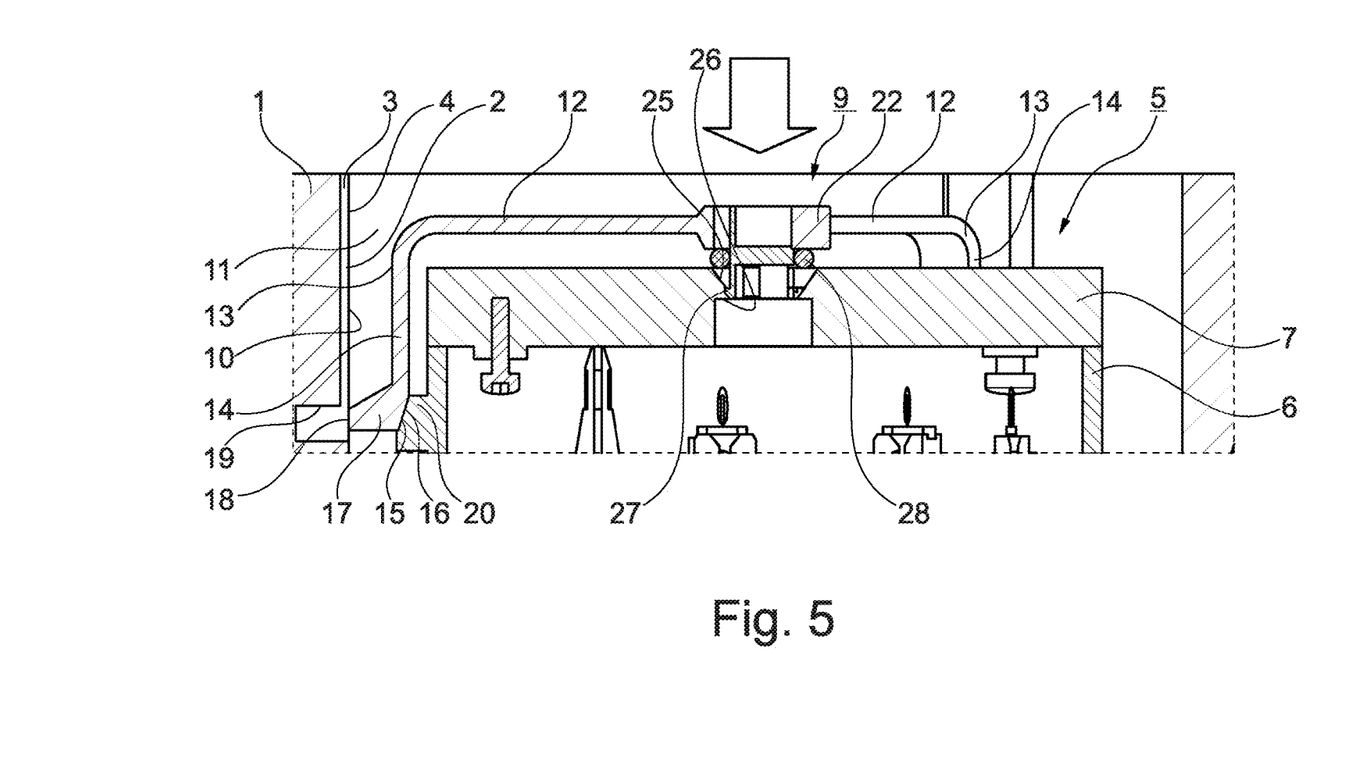
FIG. 5 shows a longitudinal section through the arrangement of FIG. 4.

FIGS. 4 and 5 show a second example embodiment of the fastening of the clamping device 9 on the upper side of the housing cover 7. The housing cover 7 has a central opening 25 with an undercut 26 (preferably formed as a circumferential shoulder so that the rotational position can be freely selected). In the corresponding central, annular region 22, from which the clamping arms 12 extend, the clamping device 9 has at least one hook-shaped projection 27 on the underside, which is of elastic design and is bent inwards during assembly and springs outwards at the end of the insertion section and engages behind the undercut 26 so that it latches with the housing cover 7. The press-in force required for this is provided by a press tool. For sealing, an O-ring 28 is provided, which is arranged between the underside of the clamping device 9 and the upper side of the housing cover 7 and surrounds the central, annular area of the clamping device 22 on the circumference and seals the two components 9,7 between the hook-shaped projection 27 and the opening 25.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor vehicle cooling system, comprising:
an electric coolant pump;
a housing that houses a pump shaft; and
a clamping device; wherein
the electric coolant pump includes an electric motor located in a motor housing;
the electric coolant pump is at least partially accommodated in the pump shaft;
the clamping device includes at least two clamping arms fastened to an upper side of the motor housing, the clamping arms being provided with free ends thereof against an inner side of the pump shaft and clamping the electric coolant pump to the housing;
wedge-shaped projections are provided on a lateral surface of the motor housing, each of the at least two clamping arms being supported on one of the projections; and
a total height of the projections increases downwards in a longitudinal direction from the lateral surface, such that when the clamping device is mounted on the upper side of the motor housing, the clamping arms slide on the wedge-shaped projections and are spread outwardly away from the longitudinal axis of the electric coolant pump.

2. The motor vehicle cooling system according to claim 1, wherein the free ends of the clamping arms engage in corresponding recesses of an inner side of the pump shaft to provide a positive fit.

3. The motor vehicle cooling system according to claim 2, wherein the recesses are window-shaped.

4. The motor vehicle cooling system according to claim 3, wherein the clamping arms are wedge-shaped in an end region and have a total height decreasing outwards in a radial direction.

5. The motor vehicle cooling system according to claim 4, wherein the wedge-shaped projections of the motor housing and a normal of the lateral surface of the motor housing enclose a slip angle which is smaller than an angle of the wedge-shaped region of the clamping arms.

6. The motor vehicle cooling system according to claim 1, wherein
the clamping device includes a central fastening portion from which the clamping arms extend radially outwards parallel or substantially parallel to the upper side of the motor housing; and
the clamping arms are spaced uniformly or substantially uniformly in a circumferential direction with respect to a longitudinal axis of the electric coolant pump.

7. The motor vehicle cooling system according to claim 6, wherein the motor housing includes, on the upper side, a threaded dome with an external thread on which the central fastening portion of the clamping device is placed and is fastened by a nut.

8. The motor vehicle cooling system according to claim 1, wherein
the motor vehicle cooling system includes a circumferential gap between the electric coolant pump and the pump shaft, the clamping arms including a first bend to extend in a first region parallel or substantially parallel to a peripheral surface of the motor housing, and a second bend defining a second region between the second bend and the free end, the second region of the clamping arms spanning the circumferential gap.

9. The motor vehicle cooling system according to claim 1, wherein the motor housing includes, on the upper side, an opening with an undercut into which the clamping device engages by being pressed in an axial direction.

* * * * *